INVENTOR.
RICHARD D. GRAYSON
By George J. Netter
Attorney

July 23, 1968   R. D. GRAYSON   3,393,869
HEATING CONTROL APPARATUS

Filed Feb. 20, 1967                                    2 Sheets-Sheet 2

INVENTOR.
RICHARD D. GRAYSON
By George J. Netter
ATTORNEY.

United States Patent Office 3,393,869
Patented July 23, 1968

3,393,869
HEATING CONTROL APPARATUS
Richard D. Grayson, Arcadia, Calif., assignor to International Telephone and Telegraph Corporation, a corporation of Delaware
Filed Feb. 20, 1967, Ser. No. 617,124
10 Claims. (Cl. 236—51)

ABSTRACT OF THE DISCLOSURE

A drumlike member is fixed onto the shaft of heating control apparatus settable to different desired control temperature by rotation of the shaft. A pair of friction braking members are urged against the drumlike member, preventing rotation of the shaft to the off position induced by a spring. A bimetal plate deforms, upon electric heating initiated by a command signal, to cam one of the braking members out of engagement with the drumlike member permitting the latter to be driven toward off by its spring. A notch in the drumlike member is engaged by a detent to stop rotation at a predetermined temperature setting and disengage the bimetal plate.

---

The present invention relates generally to heating control apparatus, and, more particularly, to a regulating device for automatically setting such apparatus to a predetermined heating condition upon completion of an opening cycle.

It has been found desirable in modern day cooking range systems to provide the capability for reducing heating after a given heating time cycle to some lower or "warming" temperature, rather than abruptly discontinuing heating. Users of the ranges have found it quite helpful to be able to have food automaticaly kept warm (approximately 170-degrees Fahrenheit) for some period of time after cooking has been completed. Of course, the automatic feature frees the user from the necessity of having to closely monitor the cooking time.

Cooking range heating control apparatus in the past most often have used dial and shaft devices incorporating a disc notched at predetermined temperature locations. When adjusted, a detent would snap into and out of the notches in the disc making a decided clicking noise that many find objectionable. Also, in such a structure the edges of the notches and the detent can wear to such an extent, as a result of the repeated engagement-disengagement actions gone through for each setting, that either sticking or poor control registry is obtained.

It is therefore, a primary object of the present invention to provide heating control apparatus having continuous and uniformly smooth operation throughout the full setting range unaccompanied by selection clicking noises.

Another object of the invention is the provision of heating control apparatus regulated on command to a predetermined setting.

Briefly, the above objects of the invention are accomplished providing a thermostatic type, manually operated, dial and shaft heat control that is spring-loaded urging return to its lowest temperature setting. A drum mounted on the shaft has first and second brake shoes forming a caliper brake that when engaged prevents motion induced by the spring-loaded shaft, but permits manual adjustment. The caliper brake is released through linkage actuated by a bimetal lever thermally powered by an electric command signal. A detent engages the released drum to set the heat control switch at a predetermined position, while simultaneously the bimetal lever is disengaged.

Other objects and advantages of the invention will be apparent to those skilled in the art to which it pertains with reference to the following drawings in which.

Figure 1:
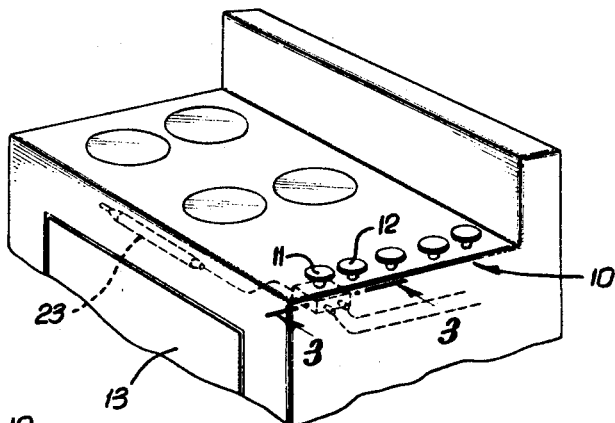
FIGURE 1 is a perspective, fragmentary depiction of a cooking range console showing the heating control apparatus of the invention.

With reference now to the drawings and particularly FIGURE 1, there is shown a console 10 of a cooking range that is conventionally provided with a plurality of knobs and dials for turning individual burners on and off, and setting the oven temperature and appropriate time period of heating for the oven, among other things. Of particular interest here are the dial 11 for adjustably controlling oven temperature and dial 12 manually settable to provide a desired time period for which the oven is to remain at the temperature indicated by dial 11.

Figure 2:
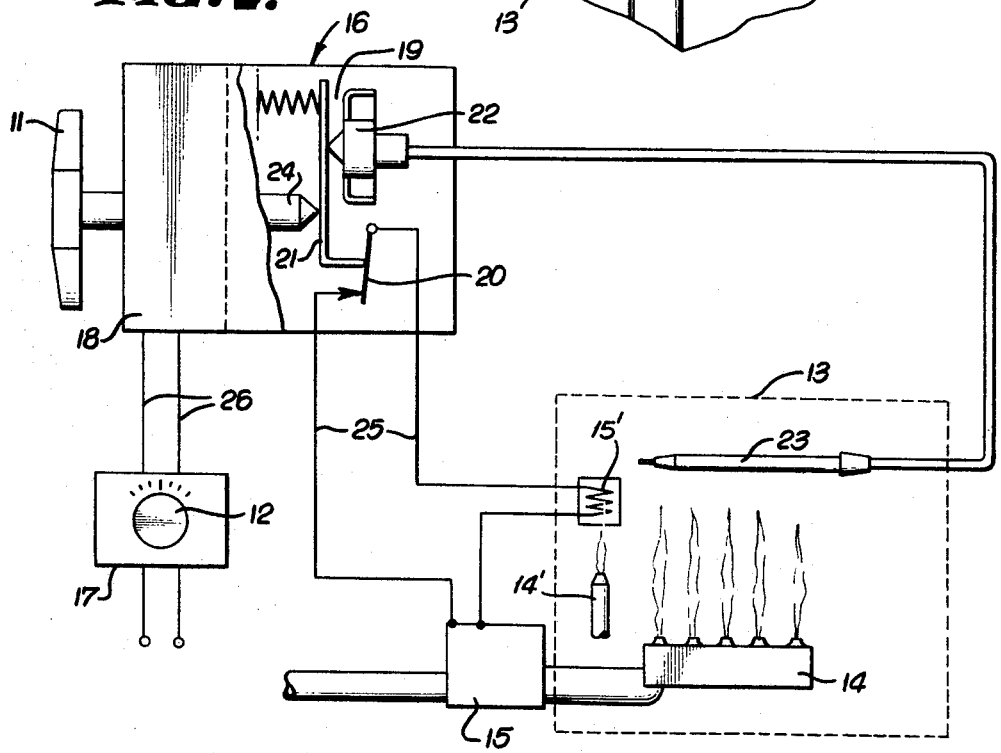
FIGURE 2 is a diagrammatic, electrical schematic illustrating the heating control apparatus of the invention in a cooking range system environment.

Attention is now directed to FIGURE 2 and the system environment in which the present invention operates and in connection with which it is especially useful and advantageous. The range oven 13 is shown in generalized dashed-line form. Gas burner heating means 14 are located within the oven 13 and an electrically actuated gas valve 15 for controlling gas flow to the burner is situated conveniently adjacent. A pilot burner 14' heats a thermocouple type generator 15' to provide power for actuating the gas valve 15. The special heating control apparatus of the invention designated generally as at 16 and a timer 17 are mounted to the range console with their respective dials 11 and 12 located as shown in FIGURE 1.

The heating control apparatus 16 includes a regulating device 18, the detailed construction of which will set forth later herein, that is operatively related to a thermostatic switch 19 of conventional design. Although other means might be found to be equally satisfactory, the type of thermostatic switch had in mind includes a set of contact points 20 actuated through a lever 21 by a fluid bellows 22. A probe 23 having an end located within the oven 13 is filled with fluid that is in pressure communication with the bellows 22. Adjustment of the dial 11 shifts the end of the shaft 24, serving as a fulcrum for the lever 21, thereby requiring more or less fluid pressure, as the case may be, in the bellows 22 to change the condition of the points 20.

As to system operation, the dial 11 is set to some desired temperature and, assuming points 20 to be initially closed, power is made available to the valve 15 by lines 25, actuating it and providing gas to the burner heating means 14 which is then ignited by the pilot burner 14'. When the temperature rises above the preset amount, the gas pressure in the bellows is then high enough to open the points 20 and shut off gas to the burner. The on-off cycling will continue until expiration of the time preset into the timer 17, when a signal is provided from the timer to the switching device 18 via lines 26. In a manner and by means that will be set forth in detail later, the timer signal actuates the switching device to readjust the shaft 24 to a setting corresponding to a "keep-warm" temperature (as indicated, approximately 170 degrees Fahrenheit). The range system will now cycle as before, but at the keep-warm temperature and beyond the control of the timer. The range user may at any time now directly make new temperature-time settings or turn the dial 11 to the off position terminating further heating altogether.

Figure 5:
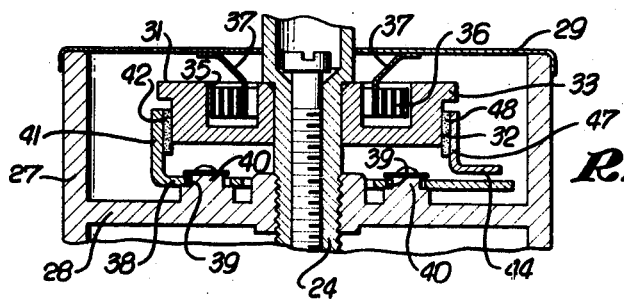
FIGURE 5 is a sectional view in elevation taken along the line 5—5 of FIGURE 3.
Figure 3:
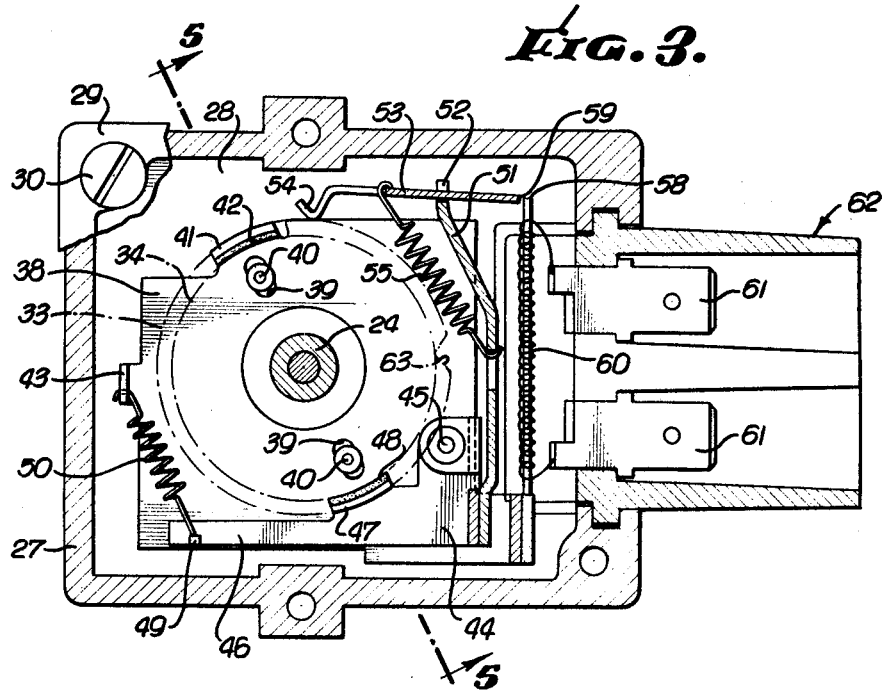
FIGURE 3 is a sectional view taken along line 3—3 of FIGURE 1 showing the relationship of the different parts of the invention during a heating cycle.

Confining attention now to the more specific structural aspects of the regulating device 18, reference is particularly made to FIGURES 3 and 5 depicting the device as it is during heating at some temperature above keep-warm. The device is generally contained within a shell-like enclosure formed by walls 27 that are approximately centered on the shaft 24 and rise from a back wall 28, which is also the outer wall of the thermostatic switch 19. A cover plate 29 is secured to the outwardly facing edges of the walls 27 by threaded members 30, for example, and includes an opening for receiving the shaft 24 therethrough.

Immediately below and adjacent the cover plate 29, there is provided a generally cylindrical drum 31 axially mounted in press fitting relationship on a reduced diameter portion of the shaft. The circumferential periphery of the drum is formed into a first relatively broad, smooth braking surface 32, and a relatively narrow camming surface 33 of diameter greater than that of 32 and in connection with which more will be said later. The drum is indicated in FIGURE 3 by the dashed-line circle 34 which is of the radius of the braking surface 32.

As seen looking into the shaft end, the drum 31 includes a hollowed-out generally annular space 35. A spiral leaf spring 36 is received within the space 35 and wound about the shaft 24. One end of the spring is secured to the drum 31 and the other end is anchored to the cover plate 29 via tabs 37. Through the reactive force of the spring 36, at all temperature settings of the dial 11 there is a restoring force exerted on the shaft tending to urge it to the off position which motion is prevented by the braking action of means to be described immediately below.

A braking plate 38 is received via an oversize opening onto the shaft 24 in a free, noncontacting relationship. A pair of openings 39, in the plate, disposed on opposite sides of the shaft and aligned with the shaft axis, are received onto mounting pedestals 40. The openings 39 are slotted along a line through the shaft axis permitting the plate 38 to float along this direction.

A portion of the plate edge adjacent an opening 39 is formed into an upstanding ear 41 extending normally of the general plane of the plate. A brake shoe 42 is fixedly carried on the surface of the ear 41 that faces the shaft 24. Relative dimensions of the ear 41 and brake shoe 42, and the location of the openings 39, are such that the shoe can be brought to bear on the drum braking surface 32 when the device is assembled. A further ear 43 is formed at the edge of the plate 38 for anchoring the end of a coil spring for a purpose to be gone into later.

An L-shaped lever member 44 is mounted for rotative movement about a fulcrum-pivot 45 extending outwardly from the plate 39. The brake arm 46 of member 44 includes a first ear 47, of similar construction to the ear 41, for carrying a brake shoe 48. The brake shoe 48 is so constructed and mounted that when the lever 44 moves it into contact with the surface 32 of the drum 31, it makes contact with the surface at areal portions diametrically opposite to those engaged by the shoe 42. In view of the fact the brake shoe 48 is adapted for selective braking or releasing by the appropriate positioning of the lever 44, this brake will be referred to as the releasable brake.

The terminus of the brake arm 46 is formed into an ear 49 to which is secured one end of a tension coil spring 50, the other end of which is anchored to the ear 43. The force of the spring 50, acting on both the braking plate 38 and the brake arm 46, continuously urges the shoes 42 and 48 toward the drum surface 32, which in the state depicted in FIGURE 3, produces dual braking at diametrically opposed regions of the drum surface 32.

Such a dual braking system is advantageous over, say a cantilevered one-area scheme in several respects. First of all, there is no tendency to "cock" the shaft 24, as a cantilevered force application does, which can provide uneven turning operation of the dial 11, or at worst malfunction. Also, with a braking force at two points, action is smoother, more sure and requires less mechanical force to operate.

The lever arm 51 of the member 44 is generally elongate and flat, the plane of which is normal to the back wall 28. The lever arm at substantially its longitudinal midpoint is deformed somewhat in a direction toward the drum with the terminus 52 of reduced dimensions extending substantially normally to the long dimension of the brake arm 46.

A detent 53 has a generally elongate rectangular body with a V-shaped detenting tooth 54 at one end, and a centrally located opening adjacent the other end for receiving the terminus 52 of the lever arm freely within. As seen best in FIGURE 3, when the detent is received on the terminus 52, the bottom of the V of the detenting tooth is pointed towards the drum 31 and is movable toward and away from the drum about the terminus as pivot point. A coil spring 55 interconnects the lever arm 51 and detent 53 urging them toward one another, which in the state shown in FIGURE 3, causes the detenting tooth to ride on the periphery of the drum camming surface 33.

A rectangular elongate bimetal plate 56 is mounted cantilever fashion at 57 to extend along and parallelly opposite the lever arm 51. The length and mounting of the bimetal plate are such that its free extremity 58 is disposed slightly spaced from and directly opposite the free end 59 of the detent. The expansion coefficients of the component metal strips forming the plate 56 are such that when heated by the electric resistance heating coil 60 wound about the plate, the extremity 58 drives against the end 59 of the detent, moving the detent and lever arm 51 in a leftward direction as viewed in FIGURE 3. Electrical connection for the heating coil is provided to the externally located lines 26 through the intermediary of connector tines 61 of a conventional female plug 62.

Referring simultaneously to both FIGURES 3 and 5, a description of operation of the regulating device 18 will be given. Having made initial settings of the temperature dial 11 and the timer dial 12, the regulating device of the invention then resides in the state illustrated in FIGURE 3. That is, both brake shoes 42 and 48 engage the drum maintaining it at the set position and the extremity 58 of the bimetal plate 55 is beyond the end 59 of the detent.

Figure 4:
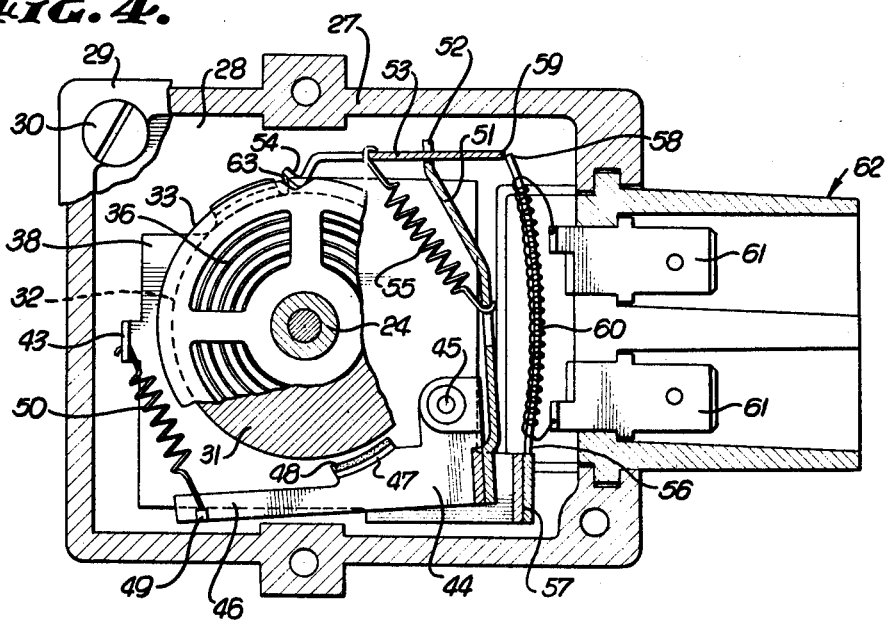
FIGURE 4 is the same view as FIGURE 3, only showing the relationship of the various parts when released to the predetermined warming setting.

At the end of the selected time period, the timer 17 gives out an electric pulse, e.g. lasting 10–15 seconds, which initiates heating of the coil 60 and hence the bimetal plate 56. When heated, the bimetal plate arcuately deforms to exert a force on the detent end 59, moving it and the lever arm 51 to the left (FIGURE 4). The latter movement releases the releasable brake shoe 48 from engagement with the drum permitting the drum to be driven toward the off position (counterclockwise in FIGURES 3 and 5) by leaf spring 36. While this is occurring, the detent tooth 54 is held against the drum camming surface 33 by coil spring 55 so that when the notch 63 registers with the tooth, engagement of the tooth and notch occurs detenting further drum rotation. This notch is identified with a setting for the thermostatic switch of the keep-warm temperature. Simultaneously on engagement of the detent in the notch, the end 59 of the detent moves toward the adjacent wall 27 thereby disengaging the detent and bimetal.

Detenting of the drum will continue until an affirmative manual setting of the dial 11 to a new temperature, or off, is made. Also, it should be noted that all that is required for initiating a new heating cycle is manually setting dials 11 and 12, no particular ordering of events being necessary.

There is therefore, provided by the practice of the present invention a regulating device for use with a rotatively set heating control switch, that provides resetting to a particular desired setting on electrical command. Further, the control switch is also made continuously and smoothly adjustable over its full range, unmarred by position-stop clicking found in certain types of prior art devices.

Although the invention was described in the context of controlling a gas heated range oven the invention is not to be considered limited in this regard. The special regulating device described herein has equal utility, and is equally advantageous, when incorporated into an electric range system, or oil fuel heating system.

While the form of the invention disclosed here constitutes a preferred form, it is to be understood that other forms might be adopted coming within the spirit of the invention and lying within the scope of the following claims.

What is claimed is:

1. A regulating device for setting a spring-biased, rotatable adjusting shaft of heating control apparatus to a predetermined adjustment in response to an electric command signal, comprising:
    a body fixed to the shaft for rotation therewith;
    movable means in force exerting contact with a surface of the body for braking rotation of the shaft;
    detent means having a first part for engaging portions of the body corresponding to the predetermined position of adjustment and a second part in movement transferring relation to the braking means;
    a temperature responsive bimetal plate having a portion for cammingly engaging the detent means causing it to move the braking means out of force exerting contact with the body surface when said bimetal plate is in a heated state, and maintaining the braking means out of contact with the body until the first part of the detent means engages the body portions at the predetermined position of adjustment; and
    heating means responsive to the command signal associated with the bimetal plate.

2. A regulating device as in claim 1, in which the braking means includes first and second brake shoe means forming a caliper brake and cammable away from bearing contact with the surface by the bimetal plate.

3. A regulating device as in claim 2, in which the brake shoe means are so disposed that bearing contact is exerted on the body surface at diametrically opposed areas.

4. A regulating device as in claim 3, in which spring means interrelate the brake shoe means resiliently urging them toward one another.

5. A regulating device as in claim 3, wherein the first brake shoe means includes a support plate having a slotted opening for being received onto a mounting stud, the opening being slotted in such direction as to permit movement of the support plate along a direction substantially solely toward and away from the shaft.

6. A regulating device as in claim 1, in which the braking means includes an actuating lever arm, and the bimetal plate is mounted adjacent as a cantilever with the free end moving upon heat deformation into operative relation with the lever arm.

7. A regulating device as in claim 6, in which the detent means includes an elongate body member pivotally mounted intermediate its ends to the braking means lever arm, one end of which body member has a detent tooth for engaging the body fixed to the shaft, and the other end of the body member is located to intercept the free end of the heat deformed bimetal plate and thereby actuate the braking means.

8. A regulating device as in claim 7, in which the body fixed to the shaft includes an axially mounted cylinder having smooth circumferential surface portions contacted by the braking means, a part of the circumferential surface portions formed into a notch to receive the detent tooth therein when the shaft is at the predetermined adjustment position.

9. A regulating device as in claim 8, wherein the free end of the bimetal plate is so disposed that upon heated deformation it moves against the other end of the body member generally along the long dimension of the detent means effecting momentary contact and actuation of the braking means.

10. A regulating device as in claim 9, in which the other end of the body member is moved out of engagement with the bimetal plate when the tooth is received within the notch.

References Cited

UNITED STATES PATENTS

| 2,810,525 | 10/1957 | Wantz | 236—46 |
| 3,341,119 | 9/1967 | Tyler | 236—51 |

WILLIAM J. WYE, *Primary Examiner.*